US007285046B2

(12) United States Patent
Papulov

(10) Patent No.: US 7,285,046 B2
(45) Date of Patent: Oct. 23, 2007

(54) MOBILE GAMING SYSTEM

(75) Inventor: Michael Papulov, Moskow (RU)

(73) Assignee: Zolotoy Arbuz, Moscow (RU)

( * ) Notice: Subject to any disclaimer, the term of this patent is extended or adjusted under 35 U.S.C. 154(b) by 117 days.

(21) Appl. No.: 11/105,067

(22) Filed: Apr. 13, 2005

(65) Prior Publication Data

US 2005/0227770 A1 Oct. 13, 2005

Related U.S. Application Data

(60) Provisional application No. 60/562,001, filed on Apr. 13, 2004.

(51) Int. Cl.
*A63F 9/24* (2006.01)
*A63F 13/00* (2006.01)
*G06F 17/00* (2006.01)

(52) U.S. Cl. ............................ 463/29; 463/42; 463/22; 463/16

(58) Field of Classification Search ................... 463/29
See application file for complete search history.

(56) References Cited

U.S. PATENT DOCUMENTS 4,652,998 A * 3/1987 Koza et al. .................. 463/26
5,569,082 A * 10/1996 Kaye ........................... 463/17
5,709,603 A * 1/1998 Kaye ........................... 463/17
5,999,808 A * 12/1999 LaDue .................... 455/412.2
6,099,408 A * 8/2000 Schneier et al. .............. 463/29
6,628,939 B2 * 9/2003 Paulsen ................... 455/414.1
6,719,631 B1 * 4/2004 Tulley et al. ................. 463/17
6,790,139 B2 * 9/2004 Walker et al. ................ 463/16
2002/0002076 A1 * 1/2002 Schneier et al. .............. 463/29
2004/0198494 A1 * 10/2004 Nguyen et al. ............... 463/42

* cited by examiner

*Primary Examiner*—Robert Pezzuto
*Assistant Examiner*—Sunit Pandya
(74) *Attorney, Agent, or Firm*—Gary J. Gershik; Cooper & Dunham LLP

(57) ABSTRACT

A mobile gaming system includes a mobile communication device connected to a gaming device via a wireless network. Encrypted gaming outcomes are transmitted from the gaming device to the mobile communication device via the wireless network as a single packet.

9 Claims, 4 Drawing Sheets

MOBILE GAMING SYSTEM

RELATED APPLICATIONS

This application claims benefit of U.S. Provisional Application No. 60/562,001, filed Apr. 13, 2004.

FIELD OF THE INVENTION

The present disclosure relates to an online gaming system. More specifically, the present disclosure relates to a system for implementing a gaming system usable via the Internet and via a mobile communication device.

BACKGROUND OF THE DISCLOSURE

On-line casinos have become increasingly popular in recent years. Typically, these on-line casinos are accessed by users using personal computers via the Internet.

In addition, advances in mobile communication devices such as cellular telephones have made data transmission and connection to the Internet via mobile communication systems possible.

Thus, it is perhaps a logical step to allow for access to on-line casino systems from mobile communication devices. Mobile communication devices, however, tend to be more susceptible to delays in communication. These delays are primarily the result of transmission limitations and propagation delays within the mobile communication system and IP network that may negatively affect the gaming experience.

Thus it is desirable to provide an on-line gaming system that allows access from mobile communication devices and avoids the problems identified above.

SUMMARY OF THE INVENTION

It is an object of the present invention to provide a mobile gaming system with an improved network response.

It is another object of the present invention to provide a method for reducing a system response time of a networked system.

It is a feature of the present invention that the network is a wireless network.

It is an advantage of the present invention that the gaming experience is not affected by transmission limitations and propagation delays within the wireless network.

These and other objects, advantages and features of the invention will become apparent to those skilled in the art upon consideration of the following description of the invention.

According to one aspect of the present invention a mobile gaming system includes a mobile communication device adapted to play a game and to generate a game outcome request, a wireless network, and a gaming device adapted to receive the game outcome request from the mobile communication device via the wireless network, wherein when the gaming device receives the game outcome request, the gaming device generates a plurality of game outcomes, encrypts the plurality of game outcomes using a key, and transmits the plurality of encrypted game outcomes in a single packet to the mobile communication device, and when the mobile communication device receives the single packet including the plurality of encrypted game outcomes and a user plays the game, the mobile communication device generates and transmits a key request to the gaming device via the wireless network, and when the gaming device receives the key request, the gaming device transmits the key via the wireless network, and the mobile communication device decrypts one of the plurality of encrypted game outcomes using the key, thereby reducing a network traffic via the wireless network.

According to another aspect of the present invention a method for reducing a system response time of a networked system includes the steps of generating an information request in a mobile communication device, transmitting the information request via a wireless network, receiving in a server the information request and producing a plurality of information units in response to the information request, encrypting the plurality of information units using a key, transmitting the plurality of encrypted information units in a single packet from the server to the mobile communication device, wherein when the mobile communication device receives the single packet including the plurality of encrypted information units, the mobile communication device generates and transmits a key request to the server via the wireless network, and when the server receives the key request, the server transmits the key via the wireless network, and the mobile communication device decrypts one of the plurality of encrypted information units using the key, thereby reducing the system response time of the network system.

These features of the invention believed to be novel are set forth with particularity in the appended claims. The invention itself however, both as to organization and method of operation, may be best understood by reference to the following description taken in conjunction with the accompanying drawings.

DETAILED DESCRIPTION OF THE INVENTION

Figure 1:
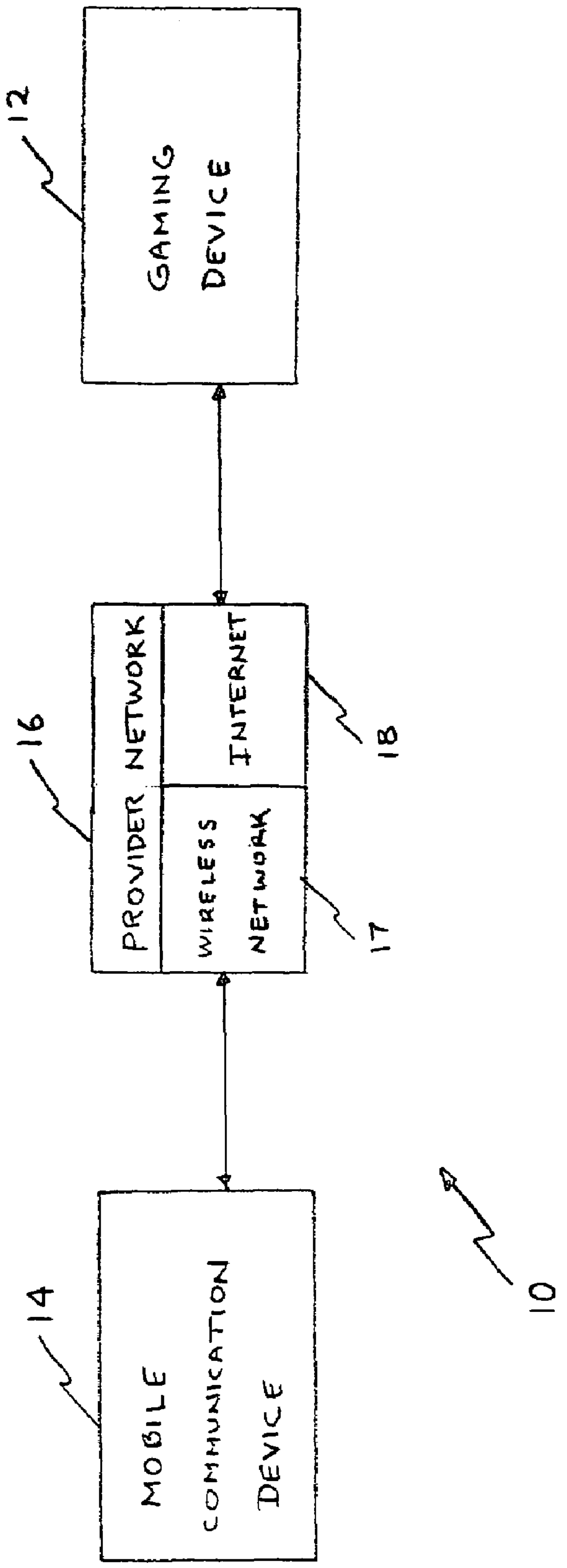
FIG. 1 is a block diagram of the on-line gaming system according to an embodiment of the present invention.

While this invention is susceptible of embodiments in many different forms, there is shown in the drawings and will herein be described in detailed specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Now turning to FIG. 1, an on-line gaming system 10 preferably includes a gaming device 12, at least one mobile communication device 14 and a provider network 16 providing communication between the remote communication device 14 and the gaming device 12, wherein the amount of data transmitted to the mobile communication device is minimized. The provider network 16 is formed of a wireless network 17 and the Internet 18.

The on-line gaming system 10 of the present disclosure is preferably accessible using a computer, via the internet and using a mobile communication device 14, such as a cellular telephone, for example. In a preferred embodiment, the gaming device 12 is accessible by mobile communication devices, such as mobile communication device 14, using WAP technology.

The gaming device 12 can be implemented as a server and is described in further detail with reference to FIG. 2. The gaming device 12 preferably includes a user interface device 20 adapted to allow the gaming device to communicate with users, a memory interface device 21 adapted to allow the gaming device 12 to communicate with one or more memory devices 22, a settlement interface device 23 adapted to allow the gaming device to communicate with one or more settlement services, a gaming module 24 adapted to implement game functions, one or more web modules 25 adapted to coordinate user interface with the gaming device 12 and a controller 26 adapted to control the user interface device 20, the memory interface device 21, the settlement interface device 23, the gaming module 24, the web module 24, and the system administrator interface 29.

The user interface device 20 preferably provides both a WEB portal for communication via the World Wide Web through the internet and a WAP portal for communication using WAP technology. Preferably, a user will initially contact gaming device 12 remotely via the internet through the WEB portal of the user interface device 20. Preferably, the user will access a web page of the on-line gaming system 10. On the WEB page the user will preferably input various information, including account information related to the user to set up an account for the particular user. The user will preferably provide a log-in name and password for accessing the on-line gaming system 10 in the future.

The memory interface device 21 allows access to one or more memory devices 22. The memory device or devices 22 are used to store account information regarding each of the users that register as described above. In addition the database 22 is preferably used to record game history information, that is, a history of game outcomes along with wager information, that is, information regarding wagers made in the various games.

In a preferred embodiment, the memory device or devices 22 will store game history information and wager information related to games played by a each particular user along with the account information of the user. In a preferred embodiment the memory device or devices 22 are one or more databases. Databases provide for both large storage capacity and an efficient means to search and retrieve information. However, any other storage media may be used.

The settlement interface device 23 allows the gaming device 12 to communicate with one or more settlement services. More specifically, the gaming device 12 communicates with one or more financial payment systems, either virtual or conventional. For example, the settlement interface device 23 may allow for communication with VISA or MASTERCARD to transfer funds into a user's account. Alternatively, a virtual payment system such as PAYPAL, for example, may be utilized. Alternatively, the settlement interface device 23 may provide for direct transfer of funds into and out of a user's bank account. More specifically, the settlement interface device 23 provides for communication between the gaming device 12 and one or more financial service providers to allow for the electronic transfer of funds into or out of user accounts.

As noted above, the gaming module 24 preferably implements gaming functions which include providing game outcomes, or results, and billing, generally based on the game outcomes. That is, the gaming module 24 provides game outcomes and provides billing information based on wagers placed in various games by various users. The gaming device 24 preferably performs the billing functions in conjunction with the settlement interface 23. The gaming module 24 preferably includes a certified random number generator (not shown) to generate game outcomes. The gaming module 24 provides game outcomes for any of several common casino games including, for example, card games, slot machine games or roulette-type games. Depending on the particular game being played, the random numbers generated are utilized to calculate a game outcome. More specifically, for each particular game, the random numbers may represent different game outcomes.

The web module 25 coordinates interaction with the user via the Internet.

Figure 3:
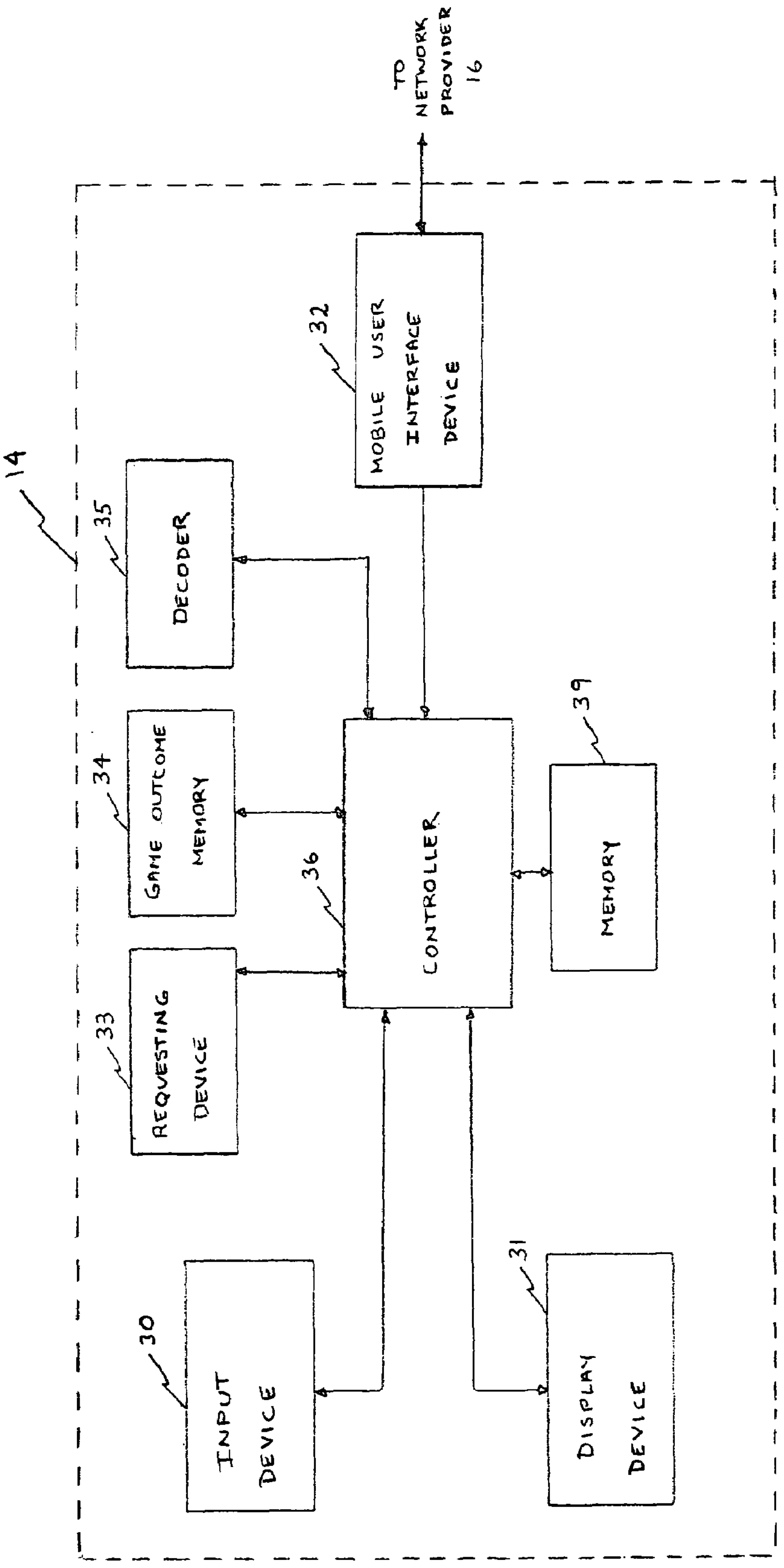
FIG. 3 is a block diagram of the mobile communication device according to an embodiment of the present invention.

Now turning to FIG. 3, the mobile communication device 14 preferably includes an input device 30 allowing the user to input information. The input device 30 may be the keypad of a cellular telephone, for example. In a preferred embodiment, the mobile communication device 14 includes a plurality of preloaded gaming applications in a memory 39. The gaming applications are preferably implemented via a mobile controller 36.

Each of the gaming applications is utilized by the mobile communication device 14 to create a particular game environment for the user. That is, the gaming applications are utilized to create an environment for a card game, a slot machine game, a roulette game, etc. The mobile communication device 14 includes a display 31 that provides a graphic representation of the game environment to the user. An audio device (not shown) such as a speaker, may also be included to provide audio information of the game environment. The gaming applications can also be downloaded from the gaming device 12.

The user preferably selects which game he or she would like to play using the input device 30. Upon selection, the game application for that game is implemented. The user is preferably prompted to supply their log-in name and password via the input device 31. This log-in information is communicated to the gaming device 12 from a mobile user interface device 32 via the provider network 16. The mobile user interface device 32 is preferably a transmission/reception device that transmits and receives various data via the provider network 16.

The gaming device 12 receives the log-in information and either accepts or rejects the user based on the log-in information. That is, the gaming device compares the received log-in information to the account information for various users stored in the memory device 22. The user is accepted if their log-in information matches that of one of the registered users.

If the user is accepted, that is, successfully logged-in, the user may review and edit their account information. As noted above, the web module 25 of the gaming device 12 allows the user to interact with their account information. Typically, the user will view their account information on the display 31 of the communication device 14 to determine the present balance in their account, and may decide to add or remove funds from their account.

Alternatively, the user may decide to play the selected game. Generally, most games that the user selects will require the user to make a wager of some sort. Typically, after indicating the wager, preferably via the input device 30, the user will enter an action command. The action command is an input that requests an action to be performed in the game environment, for example, dealing a card, exchanging one or more cards, spinning the roulette wheel, or spinning a slot machine. When such input is made, the requesting device 33 generates a request for a game outcome that is transmitted to the gaming device 12 along with the wager information via the provider network 16.

Upon receiving the request, the gaming device 12 provides a game outcome that is transmitted back to the mobile communication device 14 via the provider network 16 and stored in a game outcome memory 34 of the mobile communication device 14. More specifically, the gaming module 24 of the gaming device 12, shown in FIG. 2, provides a number from the random number generator (not shown) that is used to calculate a game outcome. The game outcome memory 34 temporarily stores the game outcome. A decoder 35 is provided to decode the meaning of the game outcome based on instructions from the game application. The game outcome is then represented to the user via the display 31 and/or speakers (not shown).

Where the remote communication device 14 is a mobile communication device such as a cellular telephone, the provider network 16 typically allows for communication via the wireless network 17 using WAP technology. More specifically, a GSM cellular telephone network may be used as the wireless network 17. Typically a GPRS channel is used to transfer data, using WAP technology. In a preferred embodiment, the mobile communication device includes a WAP browser, for example, to allow the mobile communication device to access a WAP page established via the Web modules 25 of the gaming device 12.

Naturally, game play on the mobile communication device 14, depends upon the speed of communication between the mobile communication device 14 and the gaming device 12. The speed of communications depends on transmission rates and propagation delays between the mobile communication device and the gaming device through the provider network 16. These delays may vary widely within any given network, and thus it is desirable to attempt to minimize the effect any delays will have on game play.

The on-line gaming system 10 of the present disclosure is adapted to minimize the problems caused by these delays. In a preferred embodiment, the mobile communication device 14 requests that a plurality of game outcomes be sent from the gaming device as a single packet. This packet of game outcomes is then stored in the game outcome memory 34 of the mobile communication device 14. To maintain security, the game outcomes are encrypted using a secret key in the gaming device 12 and remain encrypted while stored in the game outcome memory 34 of the mobile communication device 14.

Figure 4:
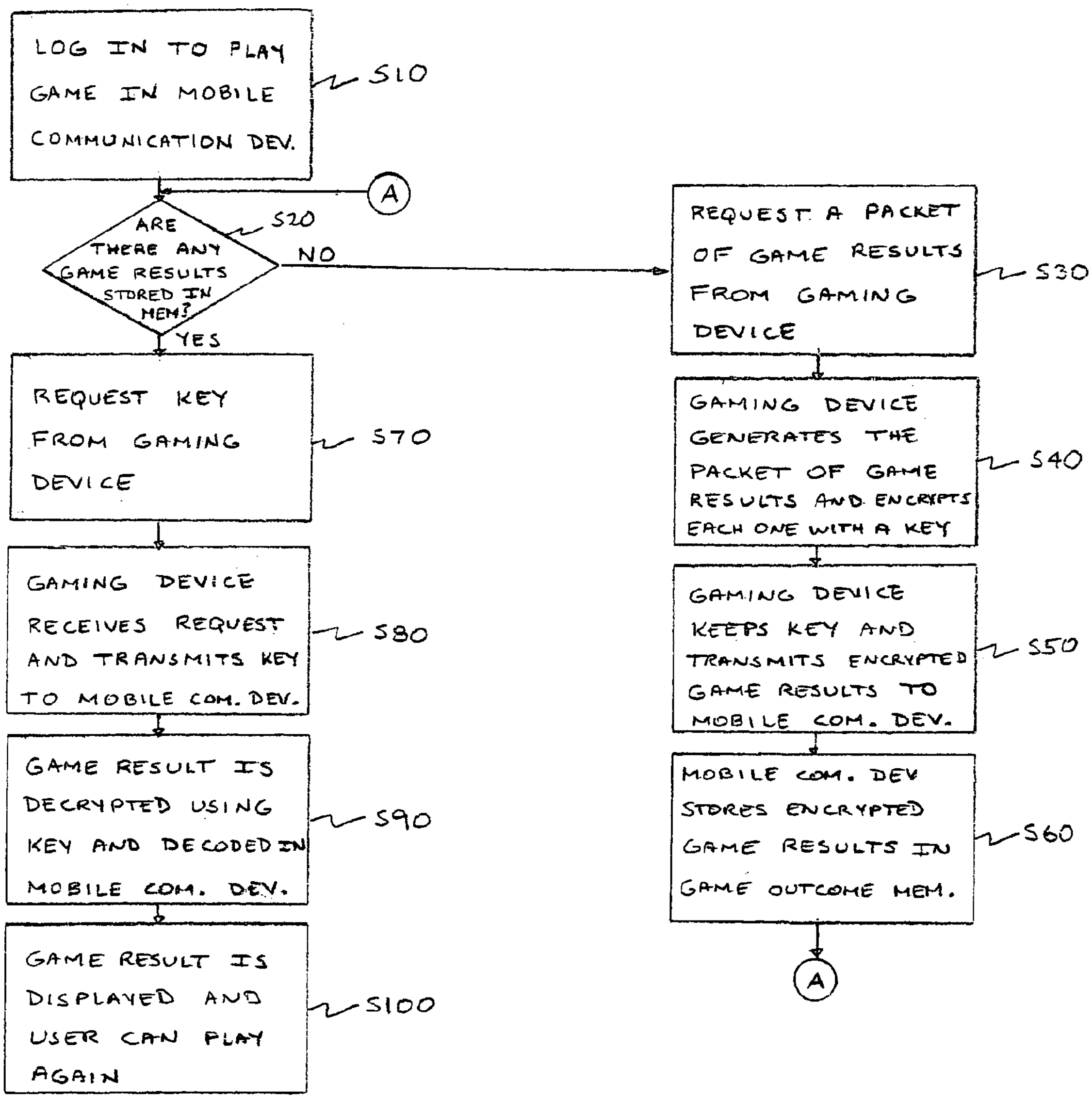
FIG. 4 is a flowchart describing the system interactions of the on-line gaming system according to an embodiment of the present invention.

This embodiment is explained in further detail with reference the flowchart of FIG. 4. A user logs into the gaming device 12 in step S10 in substantially the same manner as described above and is provided with the same options of playing a game and viewing/modifying his or her account. If the user decides to play a game, the requesting device 33 first checks with the game outcome memory 34 to see if any game outcomes are stored there in step S20. It is noted that a game outcome is considered available if it has not been used.

When no game outcomes are stored in the game outcome memory 34, the requesting device generates a game outcome packet request that requests a plurality of game outcomes to be returned in a single packet in step S30. The request is sent to the gaming device 12 in substantially the same manner as the request for a single game outcome. In response, the gaming device 12 generates several consecutive game outcomes based on the random number generator to be returned to the mobile communication device in a packet in step S40. The game outcomes are encrypted prior to being sent to the mobile communication device using the secret key in step S50. A key to the encryption for each outcome is retained at the gaming device 12. The packet of encrypted game outcomes is stored in the game outcome memory 34 of the mobile communication device 14 in step S60.

When the requesting device 33 checks the game outcome memory 34 in step S20 and there are available game outcomes stored therein, the requesting device 33 generates a request for a key in step S70 that is transmitted to the gaming device 12. In response, the gaming device returns the key to decrypt the next available game outcome in step S8O. Upon receiving the key, the game outcome is decrypted in step S90 and can then be decoded by the decoder 35 and displayed on the display 31 to the user in the manner described above in step S100. The user continues playing by repeating this procedure.

In the present embodiment, once the packet of game outcomes is sent from gaming device 12 and stored in the game outcome memory 34, only the key needs to be requested from the gaming device 12 and sent to the mobile communication device 14 via the provider network 16. Both the key request and the keys include relatively small amounts of data, and thus any delays in transmission via the provider network 16 have little affect on game play.

Figure 2:
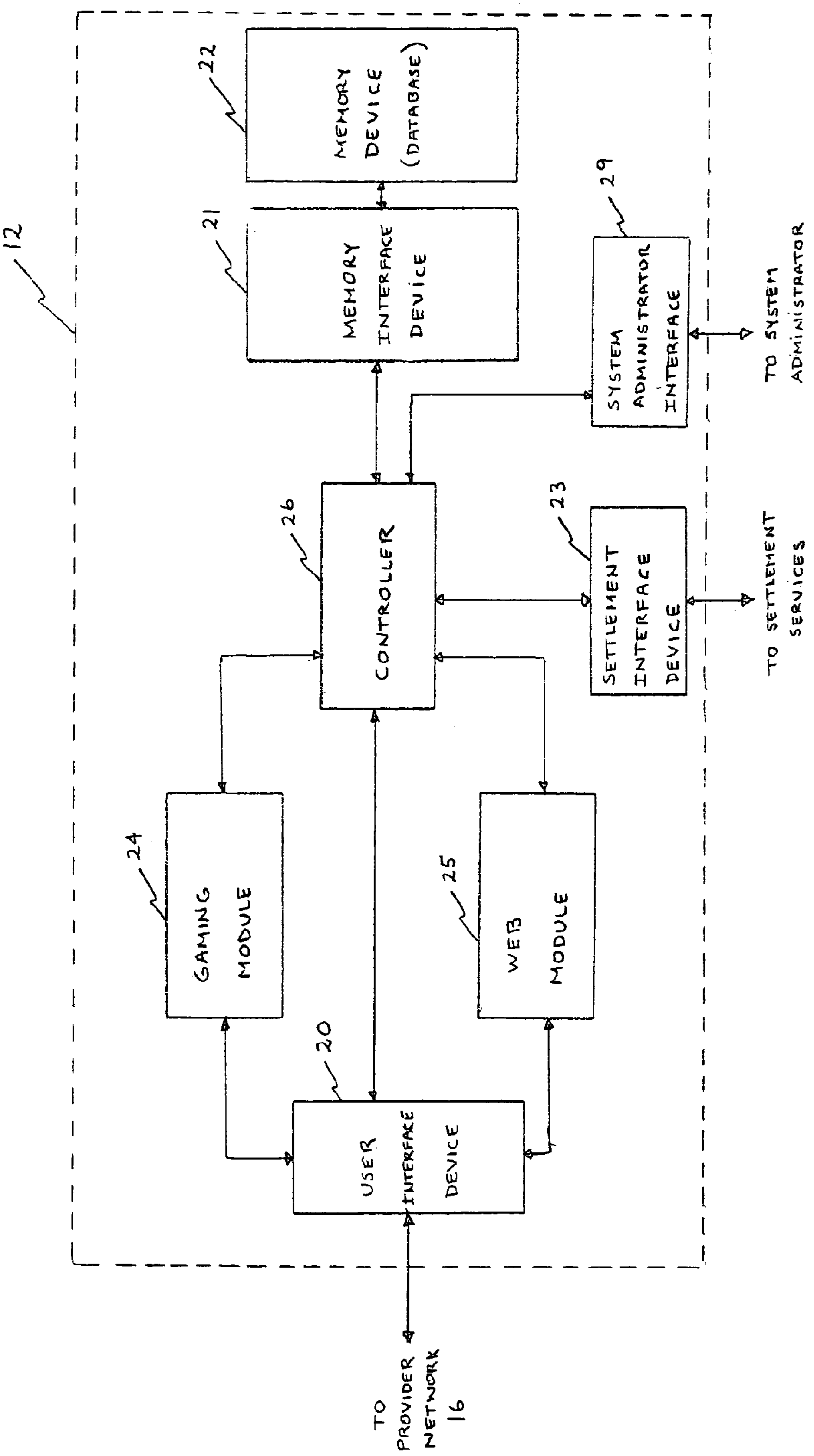
FIG. 2 is a block diagram of the gaming device according to an embodiment of the present invention.

In another embodiment of the present invention, a system administrator interface 29 in FIG. 2 is provided to enable a system administrator to monitor the operation of the gaming device 12. In this embodiment of the present invention the gaming device 12 provides the system administrator with prompt notification of attempts at unsanctioned access, cheating and various unlawful actions on the part of users. Unlawful actions can be blocked using dynamic filtering rules. The system administrator via the system administrator interface 29 can grant, suspend, or restrict the access of users to the gaming device 12.

Thus, it is apparent that in accordance with the present invention, an apparatus that fully satisfies the objectives, aims, and advantages is set forth above. While the invention has been described in conjunction with specific embodiments, it is evident that many alternatives, modification, permutations, and variations will become apparent to those skilled in the art in light of the foregoing description. Accordingly, it is intended that the present invention embrace all such alternatives, modifications, and variations as fall within the scope of the appended claims.

What is claimed is:

1. A mobile gaming system, comprising:

a mobile communication device adapted to play a game and to generate a game outcome request;

a wireless network; and a gaming device adapted to receive said game outcome request from said mobile communication device via said wireless network, wherein when said gaming device receives said game outcome request, said gaming device generates a plurality of game outcomes, encrypts said plurality of game outcomes using a key, and transmits said plurality of encrypted game outcomes in a single packet to said mobile communication device, and when said mobile communication device receives said single packet including said plurality of encrypted game outcomes and a user plays said game, said mobile communication device generates and transmits a key request to said gaming device via said wireless network, and when said gaming device receives said key request, said gaming device transmits said key via said wireless network, and said mobile communication device decrypts one of said plurality of encrypted game outcomes using said key, thereby reducing a network traffic via said wireless network.

2. The mobile gaming system according to claim 1, wherein said mobile communication device includes a game outcome memory for storing said plurality of encrypted game outcomes.

3. The mobile gaming system according to claim 2, wherein said gaming device includes a settlement interface device for providing communication between said gaming device and a financial services provider.

4. The mobile gaming system according to claim 3, wherein said gaming device further includes a web module adapted to communicate with an Internet.

5. The mobile gaming system according to claim 3, wherein said gaming device further includes a memory device for storing account information for a plurality of users.

6. The mobile gaming system according to claim 5, wherein said settlement interface device enables a user to transfer funds into and out of a user's account.

7. The mobile gaming system according to claim 6, wherein said gaming device further includes a system administrator interface for enabling a system administrator to monitor an operation of said gaming device.

8. The mobile gaming system according to claim 7, wherein said gaming device further includes a gaming module adapted to generate said plurality of game outcomes using a random number generator.

9. A method for reducing a system response time of a networked system, comprising the steps of:

generating an information request in a mobile communication device;

transmitting said information request via a wireless network;

receiving in a server said information request and producing a plurality of information units in response to said information request;

encrypting said plurality of information units using a key;

transmitting said plurality of encrypted information units in a single packet from said server to said mobile communication device via said wireless network, wherein when said mobile communication device receives said single packet including said plurality of encrypted information units, said mobile communication device generates and transmits a key request to said server via said wireless network, and when said server receives said key request, said server transmits said key via said wireless network, and said mobile communication device decrypts one of said plurality of encrypted information units using said key, thereby reducing the system response time of said network system.

* * * * *